(12) United States Patent
Unz

(10) Patent No.: US 8,306,990 B2
(45) Date of Patent: Nov. 6, 2012

(54) TRANSFERRING AND DISPLAYING HIERARCHICAL DATA BETWEEN DATABASES AND ELECTRONIC DOCUMENTS

(75) Inventor: Ron K. Unz, Palo Alto, CA (US)

(73) Assignee: Unz.org LLC, Palo Alto, CA (US)

( * ) Notice: Subject to any disclaimer, the term of this patent is extended or adjusted under 35 U.S.C. 154(b) by 381 days.

(21) Appl. No.: 11/651,739

(22) Filed: Jan. 9, 2007

(65) Prior Publication Data

US 2007/0162438 A1 Jul. 12, 2007

Related U.S. Application Data

(60) Provisional application No. 60/758,249, filed on Jan. 10, 2006.

(51) Int. Cl.
G06F 17/30 (2006.01)
(52) U.S. Cl. ....................................... 707/759
(58) Field of Classification Search .............. 707/4, 100, 707/759
See application file for complete search history.

(56) References Cited

U.S. PATENT DOCUMENTS

| | | | |
|---|---|---|---|
| 6,154,750 A * | 11/2000 | Roberge et al. ................ | 1/1 |
| 6,199,098 B1 | 3/2001 | Jones et al. | |
| 6,314,424 B1 | 11/2001 | Kaczmarski et al. | |
| 6,493,717 B1 | 12/2002 | Junkin | |
| 2001/0051949 A1 | 12/2001 | Carey et al. | |
| 2003/0037069 A1 * | 2/2003 | Davison ........................ | 707/200 |
| 2005/0114763 A1 | 5/2005 | Nonomura et al. | |
| 2005/0165824 A1 | 7/2005 | Farnham et al. | |

FOREIGN PATENT DOCUMENTS

| | | |
|---|---|---|
| JP | 2002-132782 | 5/2002 |
| JP | 2002-297603 | 10/2002 |
| JP | 2002-297602 | 11/2002 |
| JP | 2004-530173 | 9/2004 |
| JP | 2005-242998 | 8/2005 |

OTHER PUBLICATIONS

International Searching Authority, "International Search Report", PCT/US07/00664, dated Feb. 15, 2008, 11 pages.
Claims, PCT/US07/00664, 7 pages.

(Continued)

*Primary Examiner* — James Trujillo
*Assistant Examiner* — Amresh Singh
(74) *Attorney, Agent, or Firm* — Hickman Palermo Truong Becker Bingham Wong LLP

(57) ABSTRACT

An apparatus comprises data storage coupled to one or more processors and a plurality of data elements contained in a database structure and organized in a hierarchical data tree, and instructions that perform receiving a network location identifier from a client computer, wherein the network location identifier comprises at least a portion that specifies a first view of the data tree; creating, using the portion of the network location identifier, a relational database query and submitting the query to a relational database; receiving from the relational database a set of data elements that is associated with the first view; generating a first electronic document comprising the set of data elements, including generating transformative links to other network location identifiers corresponding to performing actions on nodes in the data tree; and providing the first electronic document to the client computer.

26 Claims, 6 Drawing Sheets

OTHER PUBLICATIONS

The International Bureau of WIPO, "International Preliminary Report on Patentability", PCT/US07/00664, dated Jul. 24, 2008, 2 pages.
Claims, PCT/US07/00664, 3 pages.
Chinese Office Action received in International application No. 200780002228.2 dated Jul. 24, 2009 (9 pages).
Current Claims of International application No. 200780002228.2, Oct. 2009 (6 pages).
"File/Directory Manager Tree System" widely used in Windows, Mac, and other computer operator systems dated Dec. 17, 2007 (2 pages).
Project Gutenberg book catalogue, which provides links to 20,000 free electronic books downloaded from the Internet on Feb. 1, 2008 < http://www.gutenberg.org/catalog/ > 3 pages.
Link for the Wikipedia pages on "Republication Presidential Candidates 2008" downloaded from the Internet on Feb. 1, 2008 < http://en.wikipedia.org/wiki/United_States_Republican_presidential_candidates, 2008 > 12 pages.
Link to one of the Guttenberg Project web pages provides a list of available digitized books, in text format, downloaded from the internet on Feb. 1, 2008 < www.gutenberg.org/browse/authors/p > 87 pages.
Link to Amazon.com book pages contains a link to the actual binary image of the entire book described (the "Search Inside" feature) downloaded from the Internet on Feb. 1, 2008 < http://www.amazon.com/Bronze-Screen-Chicana-Chicano-Culture/dp/0816621365/ref=si3_rdr_bb_product > 6 pages.
Link to one of the pages of digitized books available on the amazon.com website, provided in binary imagine format < http://www.amazon.com/grp/reader/0816621365/ref=sib_dp_pt/104-5869815-4825540#reader-link > dated Dec. 17, 2007 (4 pages).
Link to amazon.com page listing various books written by a particular author, Isaac Asimov downloaded from the Internet on Feb. 1, 2008 < http://www.amazon.com/gp/search/ref=sr_adv_b?search-alias=stripbooks&unfiltered=1&field-keywords=&field-author=asimov > 3 pages.
Anthropologists's webpage that contains links to several PDFs, representing various lectures and portions of a book downloaded from the Internet on Feb. 1, 2008 < http://johnhawks.net/weblog/courses/anth_304/ > 1 page.
Link to a new page in the New Republic magazine website downloaded from the Internet on Feb. 1, 2008 < http://www.tnr.com/currentissue/index.html > 3 pages.
Link to the Amazon.com page for the Isaac Asimov SF novel "Foundation", containing links to 323 user review of that book downloaded from the Internet on Feb. 1, 2008 < http://www.amazon.com/Foundation-Isaac-Asimov/dp/0553803719/ref=sr_1_1?ie=UTF8&S=books&gid=1198008378&sr=1-1 > 8 pages.
Link to one of the corresponding user-review pages on that book, containing the first dozen review; downloaded from the Internet on Feb. 1, 2008 < http://www.amazon.com/review/product/0553803719/ref=dp_top_cm_cr_acr_txt/104-5869815-4825540?%Fencodina=UTF8&showViewpoints=1 > 8 pages.
Link to the Amazon.com page for one of these reviewers, containing all the book reviews he has provided downloaded from the Internet on Feb. 1, 2008 < http://www.amazon.com/gp/cdp/member-reviews/AK81WLVD5KGUX/ref=cm_cr_dp_auth_rev?ie=UTF8&sort%Fby=MostRecentReview > 9 pages.
Link to the Amazon.com page for << Soviet Russia : A Living Record and a History >> by William Henry Chamberlin, A book from 1933 which contains no user reviews downloaded from the Internet on Feb. 1, 2008 < http://www.amazon/Soviet-Russia-Living-Record-History/dp/0548387346/ref+sr_1_4?ie=UTF8&books&qid=11980093268tsr=1-4 > 4 pages.
Link to an example of an HTML version of a 1995 book review from Reason Magazine, which contains links to the amazon.com pages for the four books reviewed, downloaded from the Internet on Feb. 1, 2008 < http://www.reason.com/news/show/29780.html > 5 pages.
Link to Wikipedia page on Leonard Woolf, that contains a listing of his books, including external links to copies at Project Guttenberg and amazon.com, and also to one book review, downloaded from the Internet on Feb. 1, 2008 < http://en.wikipedia.org/wiki/Leonard_Woolf > 3 pages.
Browse Issues dated Apr. 1, 1999, downloaded from the Internet on Mar. 24, 2011 < http://search.opinionarchives.com/TNL_Web/BrowseIssues.aspx > (1 page).
Browse Issues Expanded dated Apr. 1, 1999 downloaded from the Internet on Mar. 24, 2011 <http://search.opinionarchives.com/TNL_Web/BrowseIssues.aspx?sess=&issue=1935/9/18/38 > (1 page).
Australian Office Action received in Application serial No. 2007204902 dated Nov. 29, 2010 (2 pages).
Current Claims in Australian Application serial No. 2007204902 dated Nov. 2010 (7 pages).
European Patent Office, "Office Action", Received in Application No. 0716511.6-1225, Applicant: Unz.org, LLC., Dated Feb. 16, 2012.
Current Claims in Application No. 0716511.6-1225, Applicant Unz.org, LLC, dated Feb. 2012, 4 pages.
Japan Office Action received in application No. 2008-550385, dated Apr. 4, 2010, 5 pages.
Current Claims in application No. 2008-550385, dated Apr. 2010, 8 pages.

* cited by examiner

System Administration  Currently [Admin]  Toggle User Mode
[Processing] [System] [User Accounts] [User Activity] [Hit Activity] [Analysis] [Help Editor]
[Files]

URL=[View=Basic&OpenNodes=96278,96281,96690]
Sort by: [Type] [Size] [Name] [Extension] [Date] / [Ascending] [Descending]

- [--] REPORT [96278]
    1. [X] AN = 1 Dir, 6 MB [96279]
    2. [X] CE = 1 Dir, 290 MB [96280]
    3. [--] CG [96281]
        1. [--] CGS [96690]
            1. [X] 1998 = 5 Files, 343 KB [96691]
            2. [X] 2000 = 5 Files, 451 KB [96692]
            3. [X] 2001 = 6 Files, 617 KB [96693]
            4. [X] 2002 = 15 Files, 4 MB [96694]
            5. [X] 2003 = 21 Files, 12 MB [96695]
            6. [X] 2004 = 10 Files, 13 MB [96696]
    4. [X] CI = 1 Dir, 158 MB [96282]
    5. [X] FR = 1 Dir, 6 MB [96283]
    6. [X] LE = 1 Dir, 33 MB [96284]
    7. [X] NC = 1 Dir, 15 MB [96285]
    8. [X] NI = 1 Dir, 101 MB [96286]
    9. [X] PP = 1 Dir, 103 MB [96287]
    10. [X] PU = 1 Dir, 29 MB [96288]
    11. [X] RE = 1 Dir, 49 MB [96289]
    12. [X] SO = 1 Dir, 4 MB [96290]
    13. [X] TR = 1 Dir, 12 MB [96291]

Fig. 2

System Administration     Currently [Admin]   Toggle User Mode
[Processing] [System] [User Accounts] [User Activity] [Hit Activity] [Analysis] [Help Editor]
[Files]

URL=[View=Basic&OpenNodes=96278,96281,96690,96694]
Sort by: [Type] [Size] [Name] [Extension] [Date] / [Ascending] [Descending]

- [--] REPORT [96278]
    1. [X] AN = 1 Dir, 6 MB [96279]
    2. [X] CE = 1 Dir, 290 MB [96280]
    3. [--] CG [96281]
        1. [--] CGS [96690]
            1. [X] 1998 = 5 Files, 343 KB [96691]
            2. [X] 2000 = 5 Files, 451 KB [96692]
            3. [X] 2001 = 6 Files, 617 KB [96693]
            4. [--] 2002 [96694]
                1. CGS_Report-2002-Cover.jpg = 812 KB    [96713]
                2. CGS_Report-2002-Cover5mini.jpg = 4 KB    [96714]
                3. CGS_Report-2002-Cover5thumb.jpg = 7 KB    [96715]
                4. CGS_Report-2002-Cover5tiny.jpg = 856 Bytes    [96716]
                5. CGS_Report-2002.pdf = 3 MB    [96717]
                6. CGS_RyanPaul-2002-Cover.jpg = 156 KB    [96718]
                7. CGS_RyanPaul-2002-Cover5mini.jpg = 2 KB    [96719]
                8. CGS_RyanPaul-2002-Cover5thumb.jpg = 3 KB    [96720]
                9. CGS_RyanPaul-2002-Cover5tiny.jpg = 563 Bytes    [96721]
                10. CGS_RyanPaul-2002.pdf = 225 KB    [96722]
                11. CGS_RyanPaul-2002n02-Cover.jpg = 153 KB    [96723]
                12. CGS_RyanPaul-2002n02-Cover5mini.jpg = 2 KB    [96724]
                13. CGS_RyanPaul-2002n02-Cover5thumb.jpg = 3 KB    [96725]
                14. CGS_RyanPaul-2002n02-Cover5tiny.jpg = 543 Bytes    [96726]
                15. CGS_RyanPaul-2002n02.pdf = 222 KB    [96727]
            5. [X] 2003 = 21 Files, 12 MB [96695]
            6. [X] 2004 = 10 Files, 13 MB [96696]
        4. [X] CI = 1 Dir, 158 MB [96282]
        5. [X] FR = 1 Dir, 6 MB [96283]
        6. [X] LE = 1 Dir, 33 MB [96284]
        7. [X] NC = 1 Dir, 15 MB [96285]
        8. [X] NI = 1 Dir, 101 MB [96286]
        9. [X] PP = 1 Dir, 103 MB [96287]
        10. [X] PU = 1 Dir, 29 MB [96288]
        11. [X] RE = 1 Dir, 49 MB [96289]
        12. [X] SO = 1 Dir, 4 MB [96290]
        13. [X] TR = 1 Dir, 12 MB [96291]

[URL_string is "View=Basic&OpenNodes=96278,96281,96690"]

<cfset OpenNodeList =
  REReplace(URL_string, ".*OpenNodes=([0-9,]+).*", "\1")>

<cfquery name="DirectoryTree" datasource="FilesDB">
        SELECT L0.* FROM files AS S,
        files AS L3,files AS L2,files AS L1,files AS L0
        WHERE S.ID=96278 AND (L0.ID=S.ID OR L0.Level > S.Level)
        AND L3.ID=L2.parentID AND L2.ID=L1.parentID AND L1.ID=L0.parentID
        AND L0.parentID IN (#OpenNodeList#)
        AND L1.parentID IN (#OpenNodeList#)
        AND L2.parentID IN (#OpenNodeList#)
        AND L3.parentID IN (#OpenNodeList#)
        ORDER BY CASE L0.Level
                WHEN 0 THEN L0.ID
                WHEN 1 THEN CONCAT_WS('-', L1.ID, L0.ID)
                WHEN 2 THEN CONCAT_WS('-', L2.ID, L1.ID, L0.ID)
                WHEN 3 THEN CONCAT_WS('-', L3.ID, L2.ID, L1.ID, L0.ID)
                ELSE L0.ID END</cfquery>

TRANSFERRING AND DISPLAYING HIERARCHICAL DATA BETWEEN DATABASES AND ELECTRONIC DOCUMENTS

CROSS-REFERENCE TO RELATED APPLICATIONS; PRIORITY CLAIM

This application claims benefit of Provisional Appln. 60/758,249, filed Jan. 10, 2006, the entire contents of which is hereby incorporated by reference as if fully set forth herein, under 35 U.S.C. §119(e).

FIELD OF THE INVENTION

The present disclosure generally relates to displaying data from databases, such as large relational databases, in electronic documents, such as on Internet web pages.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

The Internet today provides an extremely efficient means for the distribution of digitized information across the world's computers, with the web browser interface being an excellent means for the display of that information.

One popular implementation of this distribution/display model is the use of dynamically-generated web pages, in which a user-specified Uniform Resource Locator (URL) triggers the immediate creation of a web page, based on the particular information drawn from a database on the host computer.

Although the dynamic structure of the web page must be programmed in one of the web application languages such as PHP or Cold Fusion, a single such dynamic web page provides a potentially unlimited number of different data displays, based on the user's URL-derived selection parameters and also upon the possibly changing values in the host database. Since the programming need be done only one time and for one page, the efficiency of this model is tremendous, and it has become the standard method used for most websites.

The data itself is increasingly likely to reside in a relational database, typically based on the SQL database language, with MySQL, Oracle, and SQL-Server engines being among the most common. Such relational databases provide extremely high performance, efficiency of storage, and huge scalability in potential size.

Although this data distribution/display model has these major advantages, it has faced some obstacles in being conveniently applied to various types of data. Partly for this reason, Internet data has seldom been as fast and easy to display or manipulate as data in a software application residing on one's own computer.

One obstacle is that the URL used to determine the particular data shown on a webpage has effective restrictions on structure. URLs which become too long or complex are inconvenient for an individual to comprehend, manipulate, or save as a link. Maximizing the embedded informational content of a short and minimally complex URL greatly increases the effectiveness of a web display system.

Another obstacle is that many of the data sets potentially available over the Internet are of enormous size and complexity. Programming a single dynamic web page to conveniently display or manipulate such complex data sets may be a difficult undertaking, and easily prone to error.

Finally, many of the current methods for selecting and transferring data between host databases and web pages appear to be slow and inefficient, whether due to their underlying database algorithms or their display techniques. As a result, host databases may become overloaded, client or server bandwidth become clogged, and overall performance is frequently sluggish.

Taken together, these and similar difficulties have considerably restricted the effective display or manipulation of Internet-based data.

Many of these prospective large Internet data sets are hierarchical in structure, being organized into a collected family of data elements of different degrees of generality. Perhaps the most common example of such a hierarchical data set would be the directories and files on a particular computer, in which "child" directories might be contained in other "parent" directories and so forth, up to the highest level of the computer storage.

A standard means of visualizing or displaying hierarchical data has been in the form of a "tree" structure, such as the directory/file tree of a computer's hard drive. This conveniently allows the user to summarize or examine the data at any desired degree of detail by "opening" or "closing" the different nodes or branches of the tree.

Most large hierarchical data sets are either currently stored in relational databases or can quickly and easily be loaded into such database tables. Relational databases place certain important constraints upon the data-sets they contain but consequently provide enormous efficiency in the later manipulation or selection of that data.

As an example, although the descriptive information of the files and directories of a computer hard drive is not typically stored in a relational database table, it can easily be loaded into such a table, with one field being a unique identifier possibly derived from the full pathname, another being the element type (File or Directory), another being the identifier of the parent directory, and others being various other types of additional information associated with the individual files or directories.

SQL databases are the most common examples of relational databases, and typically require data elements to be assigned one or more unique identifiers, which are automatically stored and indexed for rapid retrieval by the database engine itself. Among other characteristics, SQL database engines are optimized for retrieving data selected by unique or non-unique index values and also for merging or "joining" database tables with themselves or With other tables based upon these index values.

A database query which can be written as a single, even highly-complex SQL statement, perhaps containing multiple joins or self-joins, is frequently orders-of-magnitude faster than an equivalent group of database operations in a less efficient database system.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2 illustrates an example displayed view in which a directory REPORT is open.

FIG. 3 illustrates a different displayed view.

FIG. 4 provides an example of the SQL SELECT statement that can produce an HTML directory/file tree structure from a selector URL.

DETAILED DESCRIPTION

Figure 1:
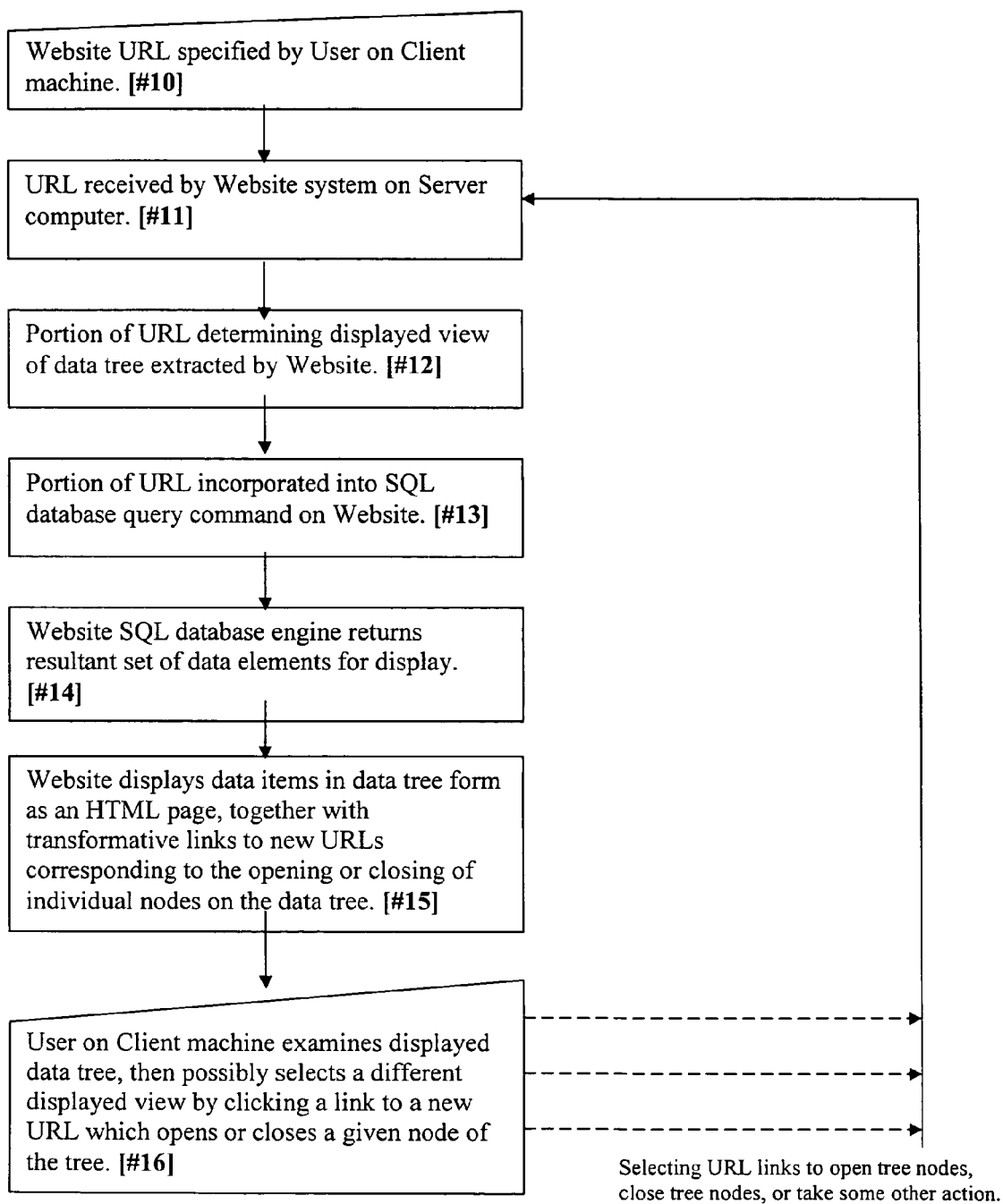
FIG. 1 shows a flow chart representing the operational sequence of an example embodiment.

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Approaches for transferring and displaying hierarchical data between databases and electronic documents are described. In one embodiment, a new software technique for transferring and displaying hierarchical data between relational databases and Internet web pages is provided, intended to increase the speed, efficiency, and simplicity of such processes. In an embodiment, the selected data is displayed in the form of a data tree, whose particular displayed view is determined by a portion of network location identifier, such as a uniform resource locator (URL), with that same portion of the string also transformed into a part of the query command for selecting the data from the database.

In one embodiment, a data processing apparatus comprises data storage coupled to one or more processors and a plurality of data elements contained in a relational database structure and organized in a hierarchical data tree, and instructions that perform receiving a network location identifier from a client computer, wherein the network location identifier comprises at least a portion that specifies a first view of the data tree; creating, using the portion of the network location identifier, a relational database query and submitting the query to a relational database; receiving from the relational database a set of data elements that is associated with the first view; generating a first electronic document comprising the set of data elements, including generating transformative links to other network location identifiers corresponding to performing actions on nodes in the data tree; and providing the first electronic document to the client computer.

In an embodiment, receiving the network location identifier comprises receiving the network location identifier comprising a list of one or more identifiers of open nodes of the data tree. In an embodiment, creating the relational database query comprises creating a structured query language (SQL) query in which at least one of the identifiers of open nodes is a parameter of a SELECT statement. In an embodiment, creating the SQL query comprises creating the SQL query which specifies selecting a result set of only those data elements whose hierarchical parents are all in the list of open nodes.

In an embodiment, generating the first electronic document comprises generating a first electronic document comprising the set of data elements, including generating transformative links to other network location identifiers corresponding to opening or closing nodes in the data tree; wherein a first transformative link corresponding to opening a node comprises the received network location identifier with an identifier of a currently closed node appended to the list of identifiers; wherein a second transformative link corresponding to closing a node comprises the received network location identifier with an identifier of a currently open node removed from the list of identifiers.

Other aspects and features will become apparent from the following description, the drawings and the appended claims.

Under an example embodiment of this invention, the displayed form of the data tree is determined by a list of the open tree nodes, and this list of open tree nodes is contained within a specific segment of the network location identifier, which may be a URL string.

This segment of the network location identifier is extracted and then embedded into a database query, which produces a result set restricted to those data elements whose hierarchical parents are all in the list of open nodes. Having been selected, these data elements are then processed by the web application language and displayed on the dynamic web page in the desired format and showing the desired information, together with any optional link or button actions.

In an embodiment, the relational database is MySQL, the web application language is ColdFusion, the web page server is Apache, the database query is presented as an SQL SELECT statement, and the data elements themselves comprise information regarding the particular files and directories of a portion of a data storage system.

If the hierarchical data to be presented is not already in a relational database format, it is first loaded into such format.

In an embodiment, the particular view of the data tree being shown is completely determined by its list of open nodes. Therefore, the open-node portion of the network location identifier selector completely determines the view of the data tree. The nodes may be represented by their unique identifiers in the relational database.

Although the exact implementation of the data tree being displayed is determined by the user, one example is a text tree, displaying purely in HTML.

Each node in the text data tree displayed may also include a link whose network location identifier-controlled action would be to close an open node or open a closed node. Particular systems may be designed to require that particular tree nodes always be open or always be closed.

The exact form in which the relational database query uses the relevant portion of the URL is not critical and may vary according to the particular database language, web application language, and system design.

FIG. 1 shows a flow chart representing the operational sequence of an example embodiment of the invention. First, the user on a client machine specifies network location identifier in the form of a particular URL for the website [#10], which is received by the website system on the server machine [#11]. Next, the website system parses the URL and extracts the portion determining the displayed view of the data tree [#12]. This URL segment is then inserted into the data tree SQL database query [#13], which returns the resultant set of displayed items from the SQL database engine [#14]. The website system then displays these returned elements in data tree form, inserting the appropriate links to new URLs representing different views of the data tree, and sending the resulting HTML page for display on the user's machine [#15]. The user can then select open or close any of the data nodes on the HTML page, representing different displayed views of the data tree, by selecting the various URL links on the page [#16].

In FIG. 2 and FIG. 3, a particular file directory named REPORT and its various subdirectories and files is displayed as a simple HTML text data tree, shown in two different displayed views, determined by two different URL segments.

In FIG. 2, the displayed view is that directory REPORT [#10] is open, as is subdirectory CG [#11], and sub-subdirectory CGS [#12]. This view is determined by the OpenNodes portion of the URL [#13], which contains the segment "OpenNodes=96278, 96281, 96690" a list of the unique ID codes of those three open directories.

Each of the lines of the text tree which represents a directory contains an initial text symbol link [X] if the directory is closed and [--] if the directory is open. Selecting these links automatically toggles the given directory between open and closed, opening closed directories and closing open directories.

An Opening link contains the current URL, but with the ID of the currently-closed directory appended to the OpenNodes segment. A Closing link contains the current URL, but with the ID of the currently-open directory removed from the OpenNodes segment. For example, the Opening Link symbol [X] next to directory 2002 in FIG. 2 contains the URL segment "OpenNodes=96278, 96281, 96690, 96694" with the last ID in the list being that corresponding to Directory 2002. Therefore, clicking this link would reload the same web page but with a new URL indicating that the Directory 2002 should be shown as open rather than closed. This new URL corresponds to the different displayed view shown in FIG. 3.

FIG. 4 provides an example of the SQL SELECT statement that can produce an HTML directory/file tree structure from a selector URL. The SQL Select statement is embedded in a function call expressed in the ColdFusion web application language. The example Cold Fusion/SQL statement returns those files or directories to be displayed on the screen in FIG. 2, namely those all of whose parents are contained in the list of open nodes.

In the SQL statement, the variable ID represents the unique identifier for a particular file or directory, parentID is the unique identifier for the parent directory, and Level represents the level of the file or directory, with the top-level directory being 0, its subdirectories 1, its sub-subdirectories being 2, and so forth. The particular example statement provided can displayed directory structure of four levels of depth.

After a SQL query as described has returned the files and directories to be displayed on the screen, standard web application programming can be used to produce the displayed format of the HTML tree.

Under normal circumstances, only a single SQL SELECT statement as described herein is required to generate the values for any displayed view of a hierarchical data tree of any specified size. As a consequence, minimal strain is placed on the database server and the response is extremely rapid.

In addition, these approaches minimize the programming complexity required to design a dynamic web page by providing a natural mapping between the selection URL and the database selection query. Also, since relatively few nodes of a given data trees are usually open at a given time, this approach minimizes the size and complexity of the selection URL.

Figure 5:
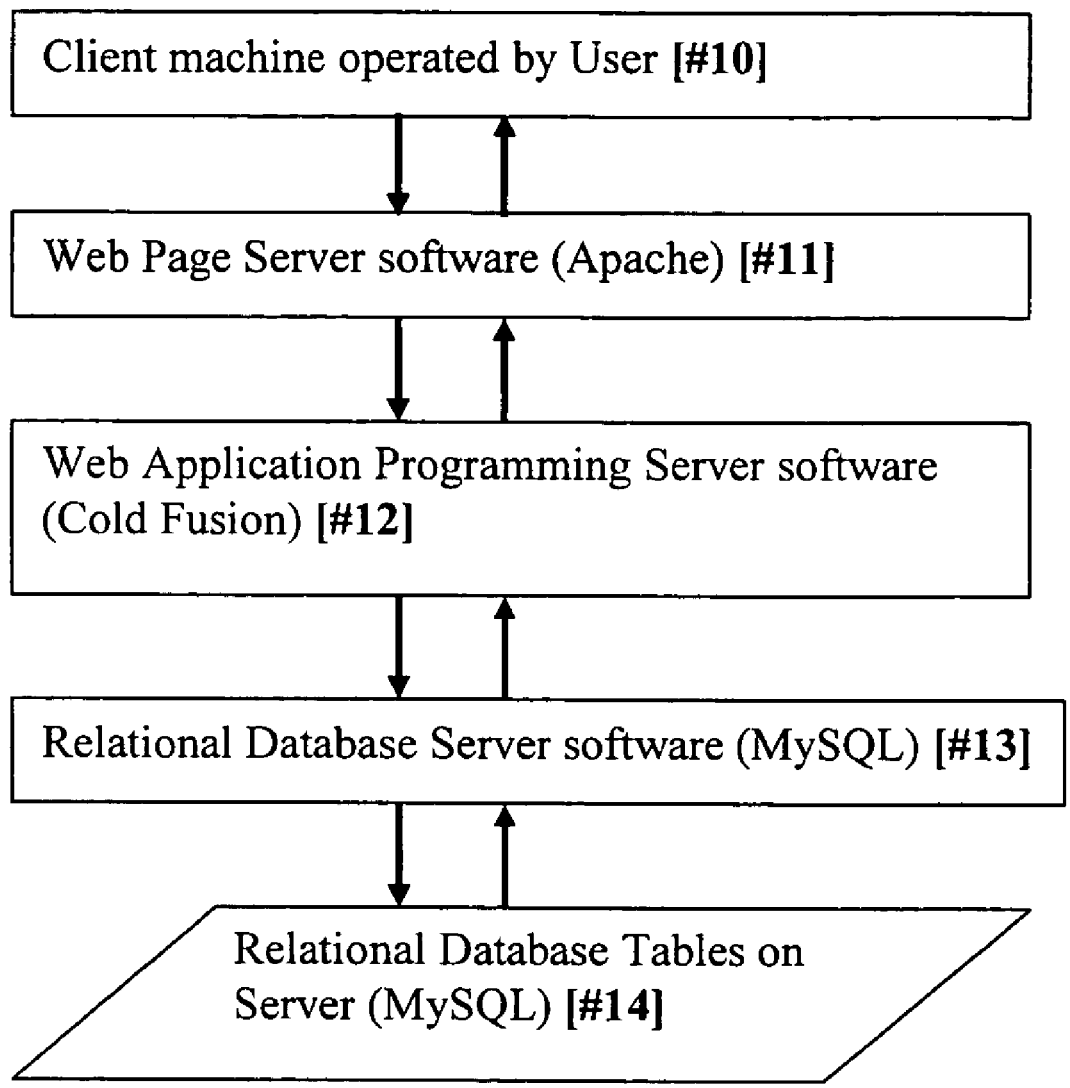
FIG. 5 provides a block diagram representing major components of the example embodiment.

FIG. 5 provides a block diagram representing major components of the example embodiment. A client machine [#10] is coupled directly or indirectly through one or more networks to one or more computers that host a web server, an application server, and a database server. In one embodiment, the web server is the Apache web server [#11], the application server is the Cold Fusion web application server [#12], and the database server is the MySQL relational database server [#13], which hosts one or more MySQL relational database tables [#14].

Figure 6:
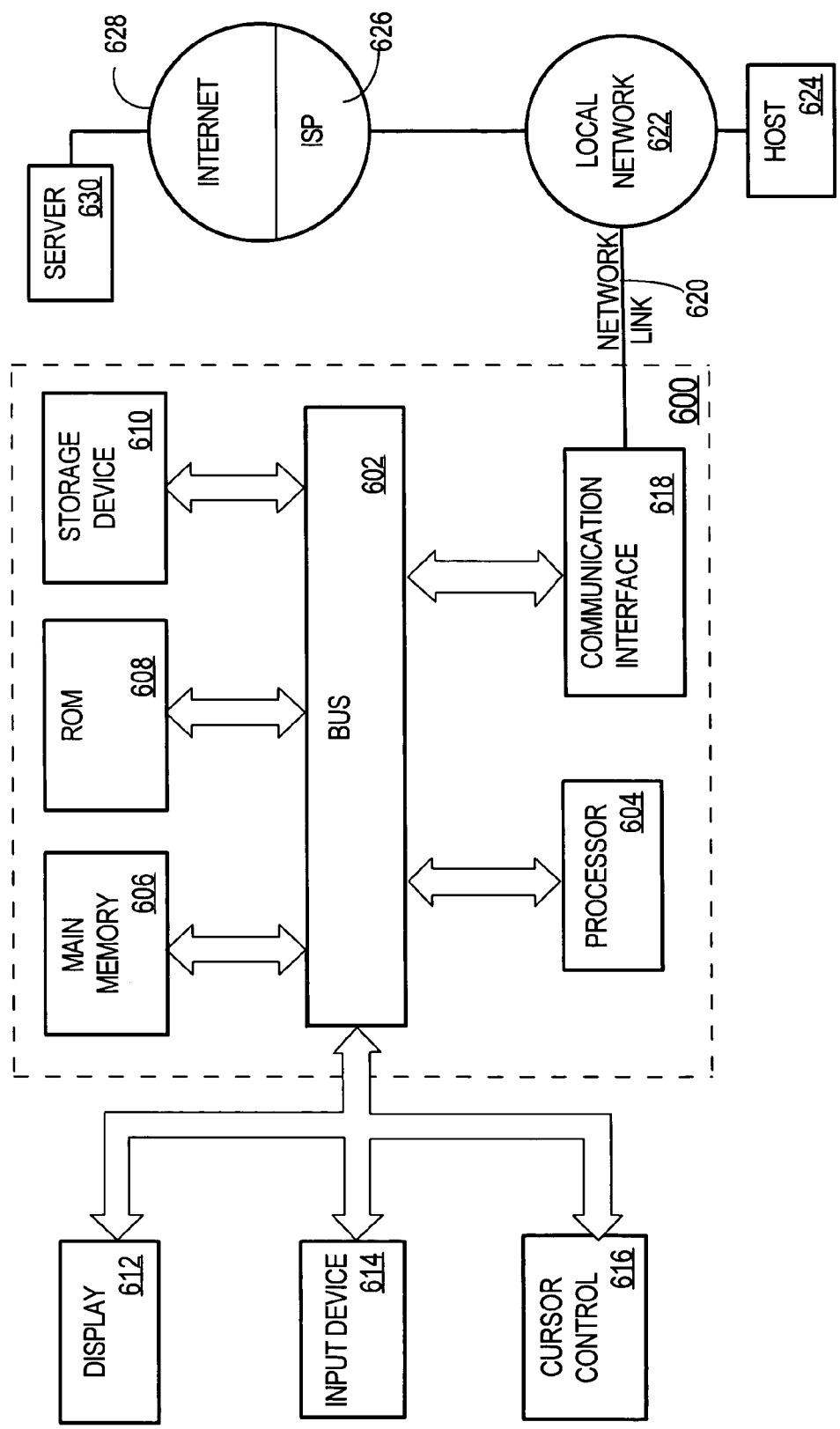
FIG. 6 illustrates a computer system upon which an embodiment may be implemented.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory ("RAM") or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory ("ROM") 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube ("CRT"), for displaying information to a computer user. An input device 614, including alphanumeric and other keys, is coupled to bus 602 for communicating information and command selections to processor 604. Another type of user input device is cursor control 616, such as a mouse, trackball, stylus, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for transferring and displaying hierarchical data between databases and electronic documents. According to one embodiment of the invention, transferring and displaying hierarchical data between databases and electronic documents is provided by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infrared transmitter to convert the data to an infrared signal. An infrared detector can receive the data carried in the infrared signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network ("ISDN") card or a modem to provide a data communication connection to a corresponding type of telephone line. As another example, communication interface 618 may be a local area network ("LAN") card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider ("ISP") 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. In accordance with the invention, one such downloaded application provides for transferring and displaying hierarchical data between databases and electronic documents as described herein.

The received code may be executed by processor 604 as it is received, and/or stored in storage device 610, or other non-volatile storage for later execution. In this manner, computer system 600 may obtain application code in the form of a carrier wave.

In one of a wide variety of alternative embodiments, instead of being composed of HTML text, the dynamic web pages displaying the data tree may be also rendered in XML or some other present or future web page format.

In another alternative, instead of being based on ColdFusion, the templates used to produce the dynamic web pages may instead use some other present or future web application programming language, such as PHP. Instead of Apache, some other present or future web page server may be used. Instead of MySQL, the underlying database system driving the creation of these dynamic web pages may instead rely on Oracle SQL, Microsoft SQL-Server, or some other present or future SQL or other relational database.

Instead of representing the open-nodes of the displayed data tree, the relevant portion of the URL selector may encode the displayed view of the data tree using some other methodology. Furthermore, multiple independent data trees may be simultaneously displayed and controlled on the web page either by concatenating their URL selectors or else combining them using another method.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. An apparatus, comprising:
   one or more processors;
   data storage coupled to the one or more processors and having recorded thereon a plurality of data elements contained in a relational database structure and organized in a hierarchical data tree;
   wherein the elements represent files, folders, or Internet web pages;
   memory coupled to the one or more processors and having recorded therein one or more stored sequences of instructions which, when executed by the processor, cause the one or more processors to perform:
   receiving a network location identifier from a client computer, wherein the network location identifier is a uniform resource locator (URL) having at least a portion that specifies a plurality of identifiers of nodes associated with a first view of the data tree;
   creating a relational database query that includes the plurality of identifiers of nodes associated with the first view of the data tree and submitting the query to a relational database;
   receiving from the relational database a set of data elements that is associated with the first view;
   generating a first electronic document comprising the set of data elements, including generating transformative links to other network location identifiers corresponding to performing actions on nodes in the data tree;
   wherein a transformative link is an opening link or a closing link;
   providing the first electronic document to the client computer.

2. The apparatus of claim 1, wherein the plurality of identifiers of nodes of the data tree comprise one or more identifiers of open nodes of the data tree.

3. The apparatus of claim 2, wherein the sequences of instructions that cause the one or more processors to perform creating the relational database query comprise sequences of instructions which, when executed by the processor, cause the processor to perform creating a structured query language (SQL) query in which at least one of the identifiers of open nodes is a parameter of a SELECT statement.

4. The apparatus of claim 3, wherein the sequences of instructions that cause the one or more processors to perform creating the SQL query comprise sequences of instructions which, when executed by the processor, cause the processor to perform creating the SQL query which specifies selecting a result set of only those data elements whose hierarchical parents are all in the list of open nodes.

5. The apparatus of claim 2, wherein the sequences of instructions that cause the one or more processors to perform receiving the network location identifier comprise sequences of instructions which, when executed by the processor, cause the processor to perform receiving the network location identifier comprising a type of view for the first view.

6. The apparatus of claim 2, wherein the sequences of instructions that cause the one or more processors to perform creating the relational database query comprise sequences of instructions which, when executed by the processor, cause the processor to perform creating a query in which at least one of the identifiers of open nodes is a parameter of a record retrieval statement.

7. The apparatus of claim 6, wherein the sequences of instructions that cause the one or more processors to perform creating the relational database query comprise sequences of instructions which, when executed by the processor, cause the processor to perform creating the relational database query which specifies selecting a result set of only those data elements whose hierarchical parents are all in the list of open nodes.

8. The apparatus of claim 1, wherein the sequences of instructions that cause the one or more processors to perform generating the first electronic document comprise sequences of instructions which, when executed by the processor, cause the processor to perform generating a first electronic document comprising the set of data elements, including generating transformative links to other network location identifiers corresponding to opening or closing nodes in the data tree.

9. The apparatus of claim 1, wherein the sequences of instructions that cause the one or more processors to perform generating the first electronic document comprise sequences of instructions which, when executed by the processor, cause the processor to perform generating a first electronic document comprising the set of data elements, including generating transformative links to other network location identifiers corresponding to opening or closing nodes in the data tree;
wherein a first transformative link corresponding to opening a node comprises the received network location identifier with an identifier of a currently closed node appended to the list of identifiers;
wherein a second transformative link corresponding to closing a node comprises the received network location identifier with an identifier of a currently open node removed from the list of identifiers.

10. An apparatus, comprising:
one or more processors;
data storage coupled to the one or more processors and having recorded thereon a plurality of data elements contained in a relational database structure and organized in a hierarchical data tree;
wherein the elements represent files, folders, or Internet web pages;
means for receiving a network location identifier from a client computer, wherein the network location identifier is a uniform resource locator (URL) having at least a portion that specifies a plurality of identifiers of nodes associated with a first view of the data tree;
means for creating a relational database query that includes the plurality of identifiers of nodes associated with the first view of the data tree and submitting the query to a relational database;
means for receiving from the relational database a set of data elements that is associated with the first view;
means for generating a first electronic document comprising the set of data elements, including generating transformative links to other network location identifiers corresponding to performing actions on nodes in the data tree;
wherein a transformative link is an opening link or a closing link;
means for providing the first electronic document to the client computer.

11. The apparatus of claim 10, wherein the plurality of identifiers of nodes of the data tree comprise one or more identifiers of open nodes of the data tree.

12. The apparatus of claim 11, wherein the means for creating the relational database query comprises means for creating a structured query language (SQL) relational database query in which at least one of the identifiers of open nodes is a parameter of a SELECT statement.

13. The apparatus of claim 12, wherein the means for creating the SQL relational database query comprises means for creating the SQL relational database query which specifies selecting a result set of only those data elements whose hierarchical parents are all in the list of open nodes.

14. The apparatus of claim 11, wherein the means for receiving the network location identifier comprises means for receiving the network location identifier comprising a type of view for the first view.

15. The apparatus of claim 14, wherein means for generating the first electronic document comprises means for generating a first electronic document comprising the set of data elements, including means for generating transformative links to other network location identifiers corresponding to opening or closing nodes in the data tree.

16. The apparatus of claim 10, wherein the means for generating the first electronic document comprises means for generating a first electronic document comprising the set of data elements, including means for generating transformative links to other network location identifiers corresponding to opening or closing nodes in the data tree; wherein a first transformative link corresponding to opening a node comprises the received network location identifier with an identifier of a currently closed node appended to the list of identifiers; wherein a second transformative link corresponding to closing a node comprises the received network location identifier with an identifier of a currently open node removed from the list of identifiers.

17. A machine-implemented method comprising:
receiving a network location identifier from a client computer, wherein the network location identifier is a uniform resource locator (URL) having at least a portion that specifies a plurality of identifiers of nodes associated with a first view of the data tree;
creating a relational database query that includes the plurality of identifiers of nodes associated with the first view of the data tree and submitting the query to a relational database;
receiving from the relational database a set of data elements that is associated with the first view;
generating a first electronic document comprising the set of data elements, including generating transformative links to other network location identifiers corresponding to performing actions on nodes in the data tree;
wherein a transformative link is an opening link or a closing link;
providing the first electronic document to the client computer.

18. The method of claim 17, wherein the plurality of identifiers of nodes of the data tree comprise one or more identifiers of open nodes of the data tree.

19. The method of claim 18, wherein creating the relational query comprises creating the structured query language (SQL) relational database query in which at least one of the identifiers of open nodes is a parameter of a SELECT statement.

20. The method of claim 19, wherein creating the SQL relational database query comprises creating the SQL relational database query which specifies selecting a result set of only those data elements whose hierarchical parents are all in the list of open nodes.

21. The method of claim 17, wherein generating the first electronic document comprises generating a first electronic document comprising the set of data elements, including generating transformative links to other network location identifiers corresponding to opening or closing nodes in the data tree; wherein a first transformative link corresponding to opening a node comprises the received network location identifier with an identifier of a currently closed node appended to the list of identifiers; wherein a second transformative link corresponding to closing a node comprises the received network location identifier with an identifier of a currently open node removed from the list of identifiers.

22. A computer-readable volatile or non-volatile medium carrying one or more sequences of instructions, which instructions, when executed by one or more processors, cause the one or more processors to carry out the steps of:
  receiving a network location identifier from a client computer, wherein the network location identifier is a uniform resource locator (URL) having at least a portion that specifies a plurality of identifiers of nodes associated with a first view of the data tree;
  creating a relational database query that includes the plurality of identifiers of nodes associated with the first view of the data tree and submitting the query to a relational database;
  receiving from the relational database a set of data elements that is associated with the first view;
  generating a first electronic document comprising the set of data elements, including generating transformative links to other network location identifiers corresponding to performing actions on nodes in the data tree;
  wherein a transformative link is an opening link or a closing link;
  providing the first electronic document to the client computer.

23. The computer-readable volatile or non-volatile medium of claim 22, wherein the plurality of identifiers of nodes of the data tree comprise one or more identifiers of open nodes of the data tree.

24. The computer-readable volatile or non-volatile medium of claim 23, wherein the instructions for creating the relational query comprise instructions for creating a structured query language (SQL) relational database query in which at least one of the identifiers of open nodes is a parameter of a SELECT statement.

25. The computer-readable volatile or non-volatile medium of claim 24, wherein the instructions for creating the SQL relational database query comprise instructions for creating the SQL relational database query which specifies selecting a result set of only those data elements whose hierarchical parents are all in the list of open nodes.

26. The computer-readable volatile or non-volatile medium of claim 22, wherein the instructions for generating the first electronic document comprise instructions for generating a first electronic document comprising the set of data elements, including instructions for generating transformative links to other network location identifiers corresponding to opening or closing nodes in the data tree; wherein a first transformative link corresponding to opening a node comprises the received network location identifier with an identifier of a currently closed node appended to the list of identifiers; wherein a second transformative link corresponding to closing a node comprises the received network location identifier with an identifier of a currently open node removed from the list of identifiers.

* * * * *